US008094679B2

(12) United States Patent
King

(10) Patent No.: US 8,094,679 B2
(45) Date of Patent: Jan. 10, 2012

(54) APPARATUS, METHOD AND COMPUTER PROGRAM PRODUCT FOR PROVIDING AUTOMATED BACKUP TO TDM NETWORK CONNECTIONS OVER AN IP NETWORK

(75) Inventor: Graham King, Clifton, VA (US)

(73) Assignee: NSGDatacom, Inc., Chantilly, VA (US)

( * ) Notice: Subject to any disclaimer, the term of this patent is extended or adjusted under 35 U.S.C. 154(b) by 0 days.

(21) Appl. No.: 11/952,818

(22) Filed: Dec. 7, 2007

(65) Prior Publication Data

US 2009/0147690 A1    Jun. 11, 2009

(51) Int. Cl.
*H04J 3/22* (2006.01)
(52) U.S. Cl. ................. 370/466; 709/239; 714/4.11
(58) Field of Classification Search .............. None
See application file for complete search history.

(56) References Cited

U.S. PATENT DOCUMENTS

| | | | | |
|---|---|---|---|---|
| 5,898,673 | A * | 4/1999 | Riggan et al. | 370/237 |
| 5,943,343 | A | 8/1999 | Hatta et al. | |
| 6,532,088 | B1 * | 3/2003 | Dantu et al. | 398/43 |
| 6,542,739 | B1 * | 4/2003 | Garner | 455/427 |
| 6,731,649 | B1 * | 5/2004 | Silverman | 370/466 |
| 6,738,351 | B1 | 5/2004 | Qureshi et al. | |
| 7,154,914 | B1 * | 12/2006 | Pechner et al. | 370/516 |
| 7,187,926 | B1 * | 3/2007 | Henkel | 455/428 |
| 2001/0008556 | A1 | 7/2001 | Bauer et al. | |
| 2005/0174935 | A1 | 8/2005 | Segel | |
| 2006/0221983 | A1 * | 10/2006 | Cavgalar et al. | 370/401 |
| 2007/0183317 | A1 * | 8/2007 | Vasseur et al. | 370/225 |
| 2008/0212619 | A1 * | 9/2008 | Scott et al. | 370/503 |

OTHER PUBLICATIONS

Crocker, Simon, "Circuit to Packet Solutions", Managed Services Made Easy in London, Jun. 14, 2007.*
"T1/E1, T3/E3 and Multi-Line Voice Service: Commercial Services over Cable HFC and Fiber Infrastructures", RAD Data Communications, Mar. 2005.*
Schwartz, Eitan, "TDMoIP vs. VoIP: Matching Technology to Requirements", RAD Data Communications, Aug. 2003.*
Crocker, Simon, "Circuit to Packet Solutions", Managed Services Made Easy in London, Jun. 14, 2007.*
Schwartz, Eitan, "TDMoIP vs. VoIP: Matching Technology to Requirements", RAD Data Communications, Aug. 2003.*
"GSM Over Satellite", New Skies Satellites B.V., Apr. 2005, vol. 2, pp. 1-18.
Office Action issued in related U.S. Appl. No. 12/270,697.

* cited by examiner

*Primary Examiner* — Seema S Rao
*Assistant Examiner* — Khoa Huynh
(74) *Attorney, Agent, or Firm* — Albrecht Tousi & Farnum PLLC; Ralph P. Albrecht; Cameron H. Tousi

(57) ABSTRACT

An automated telecommunications backup system includes a first system operable to monitor a primary time division multiplexing (TDM) link on a TDM network for a failure condition and a second system operable to back up at least a portion of the telecommunications traffic of the TDM link over a backup network. The backup network may be a packet based network, an Internet protocol (IP) based network, a satellite based network, or an IP based system over a satellite network. The first system may continuously monitor the primary TDM link and switch the functionality thereof into circuit with the TDM link upon the detection of the failure condition. The second system may compress the telecommunications traffic of the TDM link to transmit a pre-designated number of time slots thereof.

21 Claims, 4 Drawing Sheets

US 8,094,679 B2

APPARATUS, METHOD AND COMPUTER PROGRAM PRODUCT FOR PROVIDING AUTOMATED BACKUP TO TDM NETWORK CONNECTIONS OVER AN IP NETWORK

FIELD OF THE INVENTION

The present invention relates generally to data communications and, more particularly, to backup and continuity to a TDM network.

RELATED ART

In many telecommunications environments, the primary backhaul network of a telephone network, such as a cellular network, consists of one or more TDM links. For example, typically in the US, one or more T1 or a T3 links are provided from each cell tower or other point of presence, whereas in other regions of the world, one or more E1 or an E3 links are provided.

These terrestrial links are subject to occasional disruption due to physical damage caused by man made or natural disasters. Often such breaks can cause customers to be without telephone and other communications services for many hours, days, weeks and even months. This includes a corresponding break in critical emergency telephone (911) or other designated services.

One solution is to provide a backup connection for all or part of the primary backhaul link that can be used to maintain basic or emergency services during an outage. This should be low cost when inactive and automatically activated in the event of a primary link failure. Although a number of different technologies are available that could provide the basis for backup circuits, such as wireless, fiber, copper, microwave, satellite etc., each has cost or technical limitations.

Of those considered, satellite or wireless Internet Protocol (IP) connections are the most easily deployed at a reasonable cost. Satellites are particularly relevant since they are is not limited by distance or terrain, and there exist providers of low cost IP services via satellite that can provide shared access and be scaled economically for this purpose. However, satellite and wireless IP networks are not typically geared to support a number of transmission protocols and/or systems employed on primary backhaul links, such as TDM based services, and there is no existing product solution that provides automated backup of a number of such backhaul links to such a connection.

SUMMARY OF THE INVENTION

The present invention sets forth various exemplary embodiments of apparatuses, systems, methods and computer program products for providing automated telecommunications backup.

An exemplary embodiment of the exemplary embodiment sets forth an automated backup system, which includes a first system operable to monitor a primary time division multiplexing (TDM) link on a TDM network for a failure condition, and a second system operable to back up at least a portion of the telecommunications traffic of the TDM link over a backup network.

The backup network may be an Internet protocol (IP) based network, a satellite based network, or an IP based network over a satellite system. The satellite based network or system may include one or more uplinks; one or more downlinks; one or more very small aperture terminals (VSATs); and one or more geosynchronous earth orbit satellites.

The first system may continuously monitor the primary TDM link and switch the functionality thereof into circuit with the TDM link upon the detection of the failure condition. In addition, the first system may stay substantially into circuit with said TDM link and actively terminate both connection endpoints thereof.

In an embodiment, in the event such failure condition is detected by the first system, the second system substantially redirects said telecommunications traffic of the TDM link across the point of link failure. The second system may compress the telecommunications traffic of the TDM link to transmit a pre-designated number of time slots thereof. The second system may use any one of predetermined and preconfigured information to determine which portions of the telecommunications traffic to redirect.

In an embodiment, the second system provides any one of an in-band control channel and an out-of-band control channel to remotely manage any one of the TDM link and the backup network. The control channel may provide two way communications to perform any one of: providing monitoring and control functions; determining real time diagnostic and status information; and determining ancillary information.

In an embodiment, the second system is operable to reestablish the primary TDM link upon detecting by the first system that said primary TDM link has been restored. The reestablishment of the primary TDM link may be performed gradually after predetermined thresholds of stability are met.

In another embodiment where the backup network is an IP based network, the second system further include a locally generated TDM clock to account for any one of delay and jitter requirements of the TDM network over the backup IP network.

In yet another embodiment, one or more components of the telecommunications traffic of the TDM link are selected for any one of: transmission over the backup network; and blocking thereof.

The foregoing embodiments, together with embodiments directed to methods and computer program products thereof, are described in greater detail below.

BRIEF DESCRIPTION OF THE FIGURES

Various exemplary features and advantages of the invention will be apparent from the following, more particular description of exemplary embodiments of the present invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF VARIOUS EXEMPLARY EMBODIMENTS OF THE INVENTION

A preferred exemplary embodiment of the invention is discussed in detail below. While specific exemplary embodiments are discussed, it should be understood that this is done for illustration purposes only. A person skilled in the relevant art will recognize that other components and configurations may be used without parting from the spirit and scope of the invention.

Overview of Exemplary Embodiments

The exemplary embodiments provide an apparatus, method and computer program product to provide automated backup to a primary network. In exemplary embodiments, the primary network is a time division multiplexing (TDM) based network, and the backup network is an Internet Protocol (IP) based network. The backup connection may be used to restore the entire connection or a partial connection and to provide necessary or desired backup. As one example, the backup connection may be used to ensure continuity of emergency services, such as 911 services in the United States, from cell towers or other locations in the event of a network failure, or any other telecommunications based problems.

Exemplary Embodiments

The present embodiments can be performed by one or more products of NSGDatacom, Inc. of Chantilly, Va. and/or adaptation thereof in accordance with the present embodiments. Such products may include bandwidth optimization router Nx2222™ and network exchange 2205D™, among others.

An exemplary device includes voice and data compression routing capability designed for aggregating and optimizing cellular and PSTN backhaul links. The device may function as a telecommunications switching platform, to reduce network costs for operators by freeing capacity, permitting use of existing services and enabling the introduction of new services.

Figure 1:
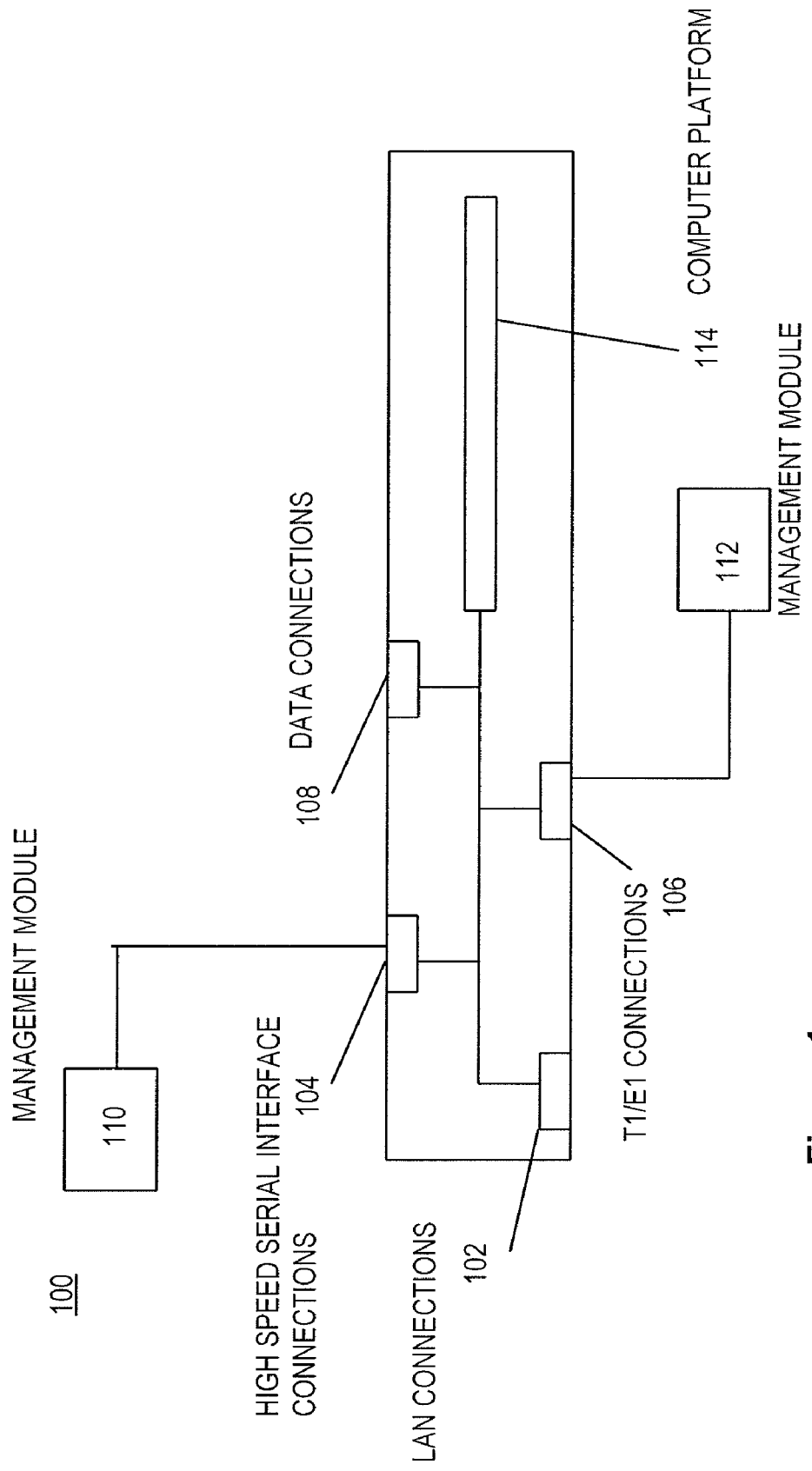
FIG. 1 illustrates an exemplary device in accordance with the present embodiments.

Referring to FIG. 1, device 100 provides hardware, software, or a combination thereof to provide an integrated and/or scalable design. As shown, the exemplary device 100 may include multiple 10/100 Ethernet LAN connections 102, multiple high speed serial interfaces 104, multiple T1/E1 connections 106, and multiple data connections 108.

Exemplary LAN connections 102 may include, for example, multiple integrated switched Ethernet interfaces, auto sensing enabled 10BaseT or 100BaseT user or hub connectivity.

Exemplary high speed serial interfaces 104 may include, for example, RJ 45 interfaces, internal or external clocking, software configurable DTE/DCE, V.24/RS-232/V.35/RS-449,/X.21, and/or high speeds from, for example, 1200 bps to 2.048 Mbps.

Exemplary T1/E1 connections 106 may provide digital voice and/or data, up to multiple channels of voice compression, drop and insert for DS0/timeslots between interfaces, support for CAS and ISDN, transparent pass through for signaling via SS7, and/or transparent TDM clock recovery over IP. Examples of connectivity provided includes, for example, from 2 to 18 T1/E1 circuits of GSM Abis or Ater traffic (as defined below), up to, for example, 548 PSTN voice, facsimile or fractional data channels accommodated therein.

Exemplary data connections 108 include voice and/or facsimile connections, exemplary IP connections, and/or exemplary Frame Relay connections, to name a few. Exemplary voice and/or facsimile connections may include, for example, support for CAS/ISDN/E&M, H.323, SIP, B2BUA, G.711, G.729a, CELP 4.8/7.4 kbps, ACELP 5.5/8.0 kbps, V.27ter, V.29 and/or Group III. Exemplary IP connections include, for example, support for VoIP, RIPv1/2, OSPF, Static Routing, SNMP, SFTM, H.323, SIP and/or B2BUA. Exemplary Frame Relay connections may include, for example, Frame Relay NNI, UNI, FRF4/ITU, Q.933, Frame Relay Annex D, LMI, including PVC and/or SVC support.

A management module 110 may interface with device 100, for example, through high speed serial interface connections 104. Management module 110 may include, for example, a Graphical User Interface (GUI) hosted, for example, by a Microsoft Windows® PC. Configuring, monitoring and troubleshooting over public, private or hybrid networks may be provided. Distributed management of existing equipment via Simple Network Management Protocol (SNMP) may also be provided. Management may also be provided remotely. For example, a management module 112 may provide remote management support over T1/E1 connections 106. In an exemplary embodiment, device 100 is remotely configurable using a GUI management system.

In one or more embodiments device 100 includes an internal or remotely accessible computer platform 114 that can perform any and all functions associated with internal processing and the foregoing network connections and associated protocols. The computer platform 114 can receive and execute software applications and display data transmitted from a management module or another computer device. The computer platform 114 may include an application-specific integrated circuit ("ASIC"), or other chipset, processor, microprocessor, logic circuit, or other data processing device. The ASIC or other processor may execute an application programming interface ("API") that interfaces with any resident programs, in a memory of the device 100. The API may be a runtime environment executing on the device 100, to operate to control the execution of applications on the device. The memory may include read-only and/or random-access memory (RAM and ROM), EPROM, EEPROM, flash cards, or any memory common to the computer platform 114. The computer platform 114 may also include a local database that can hold the software applications, or data not actively used in memory. The local database may include flash memory cells, or secondary storage, such as optical or magnetic media, tape, or soft or hard disk. In addition, computer platform 114 may be replaced by and/or may function in addition to any or all of the components of computer system 400 shown in FIG. 4.

In an exemplary embodiment, computer platform 114 provides device 100 PSTN voice compression capability via compression algorithms. Device 100 may support a mixture of both analog and/or digital PSTN voice connections with compression to a maximum of a predefined number of analog voice ports and/or digital (T1/E1) trunks per unit, with an overall maximum of voice, facsimile and/or data (DS0) circuits per unit. Analog voice ports can be configured for connection to a local PBX or to telephone handsets. The compression algorithms of computer platform 114 may, for example, provide bandwidth savings with toll quality voice compression using silence suppression (with optional user comfort noise). The compression algorithms may be used for military applications due to high quality, low bandwidth utilization and fixed rate algorithms optimized for low bandwidth satellite networks. The algorithms provide for queue buffer, jitter buffer and/or echo cancellation mechanisms deployed to maintain quality over circuits with long delays such as multiple satellite hops.

In an exemplary embodiment, computer platform 114 provides device 100 PSTN IP Gateway with Packet Switching capability via gateway and switching algorithms. As interoperability is provided, device 100 may conform to H.323 v2 and SIP (including B2BUA), enabling integration with soft switches and PC-based telephony. Device 100 provides comprehensive gateway functions that allow interfacing between different network services and types. For example, device 100 may compress SIP traffic over satellite connections, simultaneously reducing the bandwidth used by a factor and reducing the number of IP packets transmitted by a factor.

In an exemplary embodiment, computer platform 114 provides device 100 cellular backhaul and/or disaster recovery capability via cellular backhaul and/or disaster recover algorithms through, for example, integrated digital cross connect and compression gateway capability. These embodiments, described in greater detail below, are made capable via the backhaul and/or disaster recovery algorithms. In one or more such embodiments, backhaul and/or disaster recovery are provided by backup satellite links.

Figure 2:
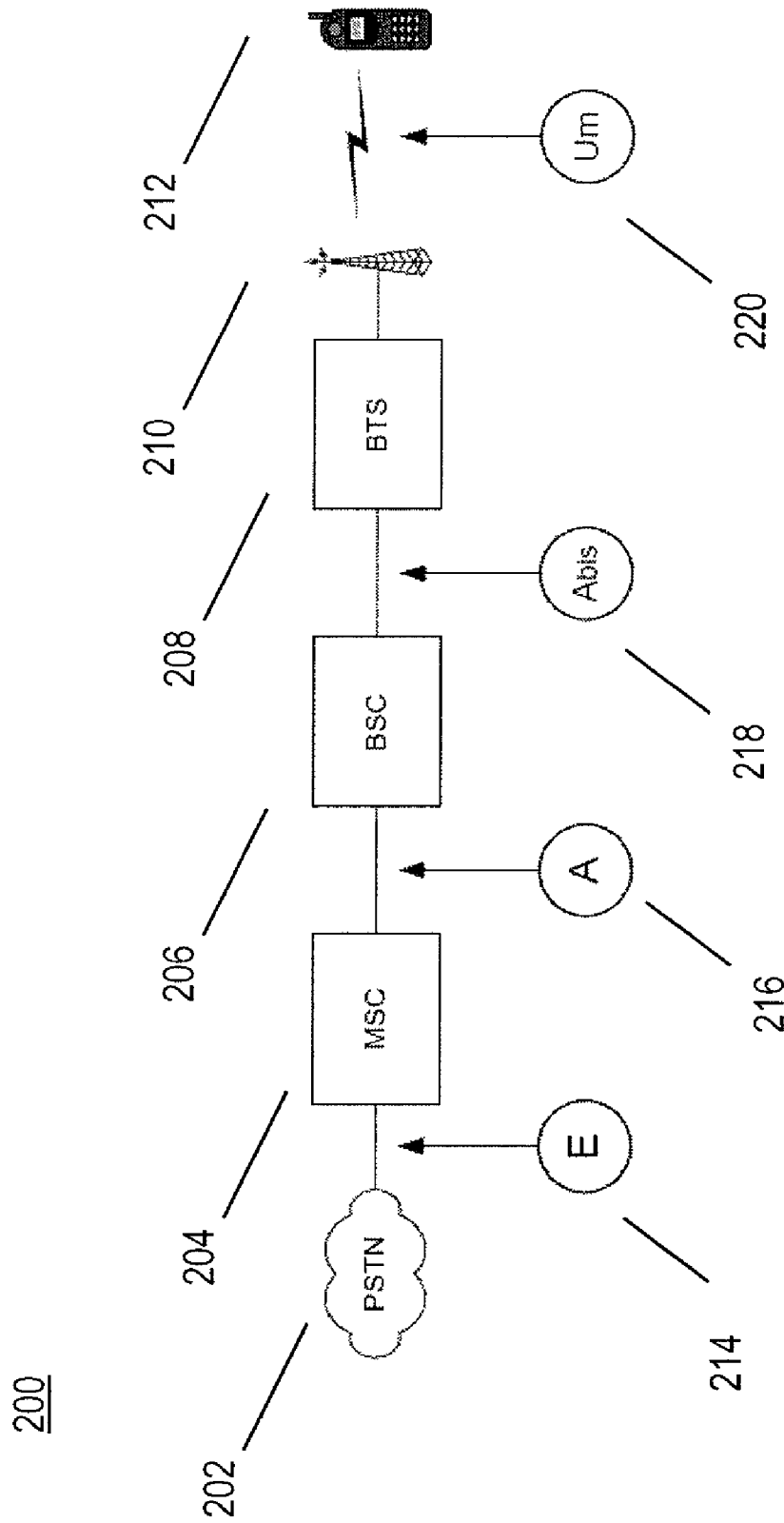
FIG. 2 illustrates an exemplary cellular network connected to the Public Switched Telephone Network (PSTN) in accordance with the present embodiments.

FIG. 2 illustrates an exemplary cellular network 200 connected to the PSTN. As shown, PSTN 202 is linked to mobile device 212 via MSC (mobile switching center) 204, BSC (base station controller) 206, BTS (base station transceiver) 208 and antenna 210. In the illustrated exemplary embodiment, cellular network 200 is a GSM system, though the present embodiments may be employed with any type of network, cellular or non-cellular.

MSC 204 controls the call set up for incoming and outgoing calls, and interfaces to PSTN 214 and other mobile networks. Typically in GSM, all calls go through MSC 204. BSC 206 allocates radio channels to individual calls and performs hand-offs between BTSs 208 located within the same BSC 206. BSC 206 also normally performs the GSM specific voice compression. A single BSC 206 may support many BTSs for coverage of a larger geographic area. BTS 208 performs the transmission over the air to the mobile device 212. BTSs 208 are located at the cellular towers throughout the coverage area. BTS 208 may include one or more GSM radios, each of which typically supports eight GSM voice calls.

The links between the foregoing units may comprise E1 links in a GSM embodiment. Accordingly, the interfaces between systems may be GSM interfaces. As shown, the respective interfaces may comprise an E interface 214 between PSTN 202 and MSC 204, an A interface 216 between MSC 204 and BSC 206, an Abis interface 218 between BSC 206 and BTS 208, and an Um interface 220 between antenna 210 and mobile device 212.

Abis interface 218 is used to connect BSC 206 and BTS 208. As there are more BTSs 208 in the network than other components, the Abis interface is typically the most common interface for the GSM network. An Ater interface (not shown) may also be implemented between a TRAU (transcoder rate adapter unit) and BTS 208. Though the TRAU, which performs voice compression, is normally located in BSC 206, it may be relocated to the MSC 204, wherein the Ater interface is implemented.

In exemplary embodiments, satellite communications are provided by Very Small Aperture Terminal (VSAT), two-way satellite ground stations with a dish antenna typically smaller than 3 meters. VSATs typically access satellites in geosynchronous orbit to relay data from small remote earth stations called terminals to other terminals in typically mesh configurations or master earth station hubs in star configurations. VSAT data rates range from about narrowband up to approximately 4 Mbit/s. As used herein, the VSAT may used to transmit narrowband data, such as polling or RFID data or SCADA, or broadband data, for IP access to remote locations, VoIP or video.

In the present embodiments, a VSAT may employ a plurality of transmission protocols. In one exemplary embodiment, the DAMA protocol transmission is used to share bandwidth in a time division mode. DAMA transmission may be used in a packet-switched environment for transmission of a large amount of data. DAMA transmission may also be used for a circuit-switched connection, wherein each user is permitted a variable slot of time on a demand (or request) basis.

In another embodiment, SCPC/MCPC protocol transmission is used. In exemplary embodiments, SCPC/MCPC provides dedicated satellite link between a few distinct locations, where the links support either a single telephone line or several telephone or data lines. The links may, for example, be permanently assigned with no carrier switching or rerouting over the satellite.

Figure 3:
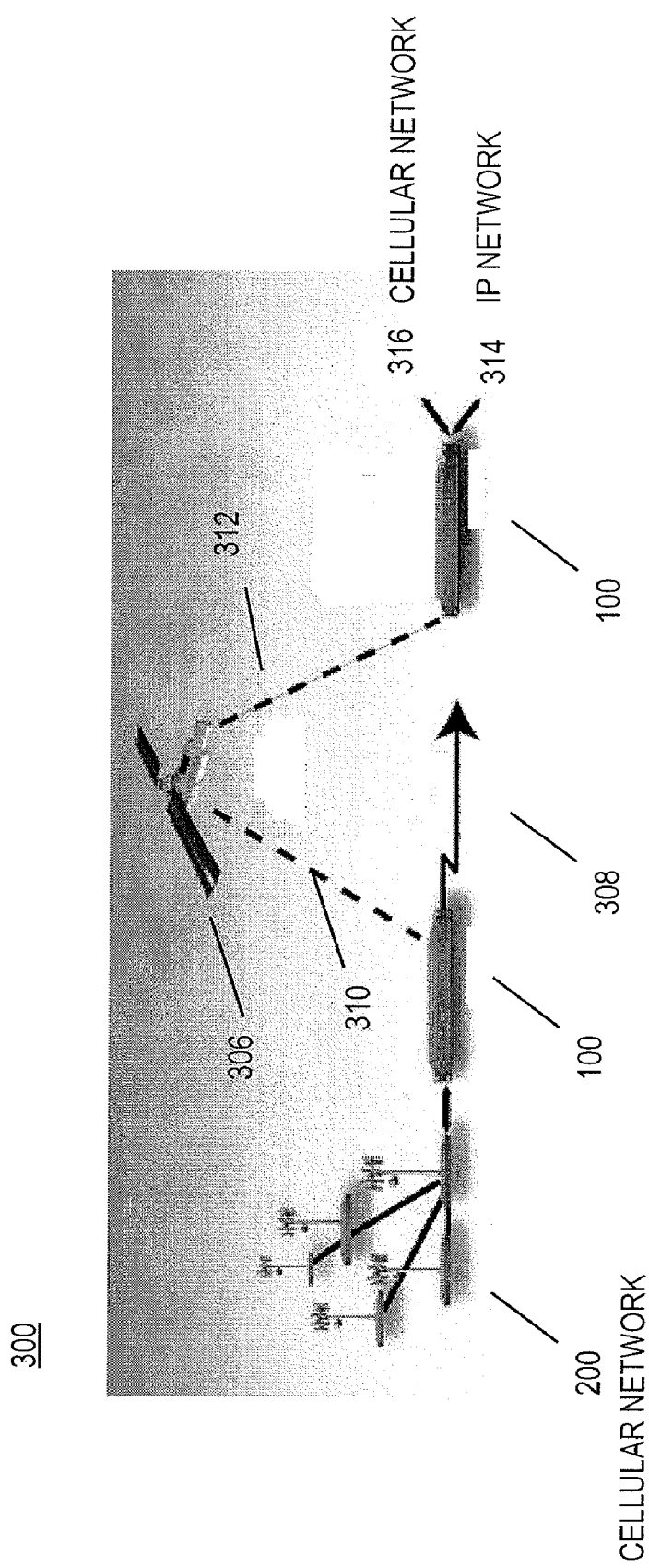
FIG. 3 illustrates an exemplary primary backhaul network and an exemplary satellite based backup network in accordance with the present embodiments.

FIG. 3 illustrates an exemplary backhaul and/or disaster recovery environment 300 in accordance with the present embodiments. Environment 300 includes the foregoing cellular network 200, another cellular network 316, and an IP network 314. Environment 300 also illustrates a device 100 (left side) connected to cellular network 200, and another device 100 (right side) connected to cellular network 316 and IP network 314.

In an exemplary embodiment, a link 308 exists between first device 100 (left side) and second device 100 (right side), which link may be across any number of telecommunications equipment. The links between the devices 100, or between any of the telecommunications devices shown or which may be used, can employ any known protocol over any known telecommunications connection. In an exemplary embodiment, any of links 308, 310, 312, for example, provide IP based backup connections, and link 308 may, for example, provide a TDM based primary backhaul connection over any trunk types, such as T1 or E1, across any combination of telecommunications equipment.

In exemplary embodiments, core or backhaul traffic may be transmitted across the circuits of exemplary network 200, across link 308, to network 316 and/or network 314. Here, in the event of a failure across link 308 for disaster or any other reason, the satellite system comprising links 310, 312 and satellite 306 are employed for traffic backup and/or rerouting. However, traffic backup and/or rerouting may be implemented in accordance with the present embodiments using any other telecommunications system, and not just a satellite system as shown, including landline and/or wireless systems.

As understood by skilled persons, cellular networks 200 and 316 may also respectively represent portions of the same cellular network. The devices may also be connected via respective VSAT terminals (not shown) or other satellite communications enabling devices with exemplary satellite 306. In exemplary embodiments, the respective uplink 310 and downlink 312 are connected over DAMA, SCPC, MCPC or other enabling protocols for transmission.

In differing embodiments where first device 100 (left side) and second device 100 (right side) provide communications between cellular network 200 and cellular network 316, for example, the satellite communications may be provided across one of the foregoing GSM or alternative interfaces. For example, in one embodiment where first device 100 (left side) is connected to BSC 206 of cellular GSM network 200, and second device 100 (right side) is connected to BTS 208 of cellular GSM network 316, the satellite communications is provided across an Abis interface. Similarly, in another exemplary embodiment, the satellite communications is provided across an Ater interface between the devices 100.

In exemplary embodiments, where cellular backhaul and/or disaster recovery algorithms are employed, first device 100 and second device 100 comprise components of the core or backhaul of the network comprising networks 200, 316 and/ or 314. As part of its functions, devices 100 may be integrated cross connect and/or compression gateways for Abis and Ater backhaul applications. For example, a number of full or fractional T1 or E1 voice/data circuits can be connected directly to the devices 100 and individual DS0s may be compressed and merged for transmission over TDM, Frame Relay or IP packet-based connections. The unused voice channels can be dynamically compressed, for example, to save bandwidth on terrestrial connections 308 or satellite connections 310, 312. TDM clock recovery may permit TDM circuits to be merged and/or transparently transmitted over IP satellite, wireless, or terrestrial links. This may include standards compliant clock regeneration and jitter buffering to synchronize remote locations to the central network. Device 100 may also communicate with a backhaul optimization and/or access router as well, and any connection into the device 100 may be configured as a network trunk or access port.

In exemplary embodiments, where cellular backhaul and/or disaster recovery algorithms are employed, first device 100 and second device 100 provide disaster recovery services. In these embodiments, device 100 provides an efficient, management oriented solution for backing up network circuits (for example, TDM network circuits), suited to situations where complete or partial failure of a circuit might cause disruption or loss of emergency services. Disaster recovery algorithms permit monitoring of the links, such as exemplary TDM links 308, and if failure is detected, automatically take control over the circuit, such as the exemplary TDM circuit, and route pre-determined traffic onto a designated backup link, such as via exemplary uplink 310 to satellite 306, and exemplary downlink 312. In exemplary embodiments, in the foregoing pass-through mode there is no delay through the devices 100 and complete power failure to the devices of the exemplary T1/E1 circuit 308 being monitored.

In exemplary embodiments, devices 100 permit remote configuration and control of the disaster recovery functions. A range of parameters of the circuit, such as the exemplary TDM circuit, are monitored with thresholds set to trigger, for example, an alarm for manual intervention, or automatic failover to one or more backup connections. In these embodiments, once the primary link 308 is restored traffic may be manually routed back onto the primary connection or automatically switched based on pre-set parameters. Operation of the backup operation can be implemented and/or optimized for operation over any types of links, including satellite networks and connections 310, 312, 306, wireless networks such as cellular networks 200, 316, as well as T1/E1 voice/data links over low speed terrestrial networks. The disaster recovery algorithm permits VPN or other security as well for protecting sensitive communications. Disaster recovery embodiments are provided in greater detail below.

First Disaster Recovery Embodiments

In a first set of embodiments, devices 100 provide the ability to unobtrusively monitor a link, such as for example a TDM link, and detect when it fails. While exemplary attributes such as TDM types of links, or T1 and E1 types of trunks are described herein, the foregoing terminology are employed for illustrative purposes only and in no way to be construed as limitations of the present embodiments.

In these embodiments, device 100 can unobtrusively monitor the transmit and receive data lines of an existing link, such as a TDM data link (for example, T1, E1, T3, E3) 308 via monitoring equipment and the disaster recovery algorithms can analyze the monitored activity and determine from this the status and thus functionality of the monitored link 308.

Device 100 can continuously analyze the activity on the link and compare the status of the link with one or more predetermined (programmable) thresholds.

Both the local TDM equipment and TDM transmission equipment may be connected to the described backup device 100 such that under normal operation a direct connection (like a normal through "patch panel") can be provided between the two. Here, in the event of a failure of the TDM link, the failure may be detected by the device 100, which only then would switch itself into circuit.

In an alternative embodiment, the configuration comprises for the monitoring device 100 to always be in circuit and actively terminate both sides of the TDM link. In the event that the TDM circuit fails, the equipment may route the existing traffic from the local side of the link 308 across the backup path 310. In exemplary embodiments, this approach adds a delay during the normal operation of the link and potentially added unreliability (decreased MTBF) resulting from the insertion of the new equipment into the otherwise active TDM circuit. MTBF generally refers to Mean Time Between Failures, and is a standard term used in the industry and can be calculated very precisely.

The monitoring may be performed by a combination of hardware and/or software. Non-disruptive monitoring circuitry may, for example, decode the T1/E1 signal which is then analyzed by software to determine if the link is active. All of this may be embodied within device 100.

Second Disaster Recovery Embodiments

In a second set of embodiments, devices 100 provide the ability to 'take over' the TDM connection to the cellular equipment at the local end and to redirect the backhaul traffic congested at connection 308 through device 100 and onto the backup connection, such as over uplink 310 to satellite 306, and onto downlink 312 to another device 100, or to other network components.

In the event that the operational status of the TDM link is determined by the monitoring equipment and disaster recovery algorithm to be outside normal operational conditions, as may be indicated by one or more of the monitored parameters crossing a predetermined threshold, device 100 may disconnect the local equipment from the TDM link 308 and establish a direct connection to the equipment such that the equipment may continue to operate as if it were still properly connected to the network.

A wide range of parameters may be monitored. For example, a simple line monitor for bidirectional activity may be used to establish that the link is physically present, connected and active. The quality of the link can be determined by monitoring alarm conditions and error rates on the link. The stability of the link can be monitored for intermittent interruptions which may cause the link to be unusable for periods. Such interruptions might be due a variety of external events that are, for example, man made or otherwise, such as periodic line testing, weather related incidents, intermittent hardware problems, satellite or wireless connectivity outages, physical damage to lines, etc. Poor link stability may, for example, result in "bouncing" between the backup link and the primary link, unless link stability is monitored over an extended period appropriate to the connection environment. In this embodiment, device 100 may be fully capable of terminating and interoperating with a fully functional link, such as a TDM link, of which there are numerous varieties and of which T1 and E1 are specific examples.

Third Disaster Recovery Embodiments

In a third set of embodiments, devices 100 provide the ability to compress the primary link, such as the primary TDM link, and only transmit required (pre-designated) portions, such as timeslots, over the backup connection. In one or more embodiments assumed here, backup bandwidth over satellite links 310, 312 may be normally be lower than that of the TDM link 308, although the latter may not be correct where the satellite circuit has the capability to provide additional bandwidth on demand.

Having determined that the backhaul circuit, for example TDM backhaul circuit, has failed and thereafter established a connection to the local equipment, devices 100 may use predetermined and/or preconfigured information to determine which parts of the circuit 308 need to be transmitted over the backup path.

Depending on the backup path being used a number of different options may be implemented at this time. For example, if the backup path is satellite circuit 310, 312, which may be part of an on-demand system such as a DAMA satellite system, device 100 may request the desired bandwidth from the system by a means standard in the industry. In this exemplary embodiment, the device 100 would select the designated portions of the circuit that need to be transmitted, possibly by function or position in the stream (for example, selected DS0's or designated emergency telephone calls), compress these if desired, convert to the appropriate protocols desired and/or required, and transmit these over the back-up path. In the event that there are multiple services being backed up, the ability to prioritize these services can be provided by devices 100, such that emergency services are given first priority, but other telephone or data services may make use of the services when not being used to provide emergency communications.

In an exemplary embodiment where the backup path is a wireless link, the process is similar to the above but may or may not include one or more of the latter functions, such as compression. This is because the bandwidth available on wireless links is typically far greater than that available on the illustrated satellite links. Also the expected delay over a satellite link is typically far longer than would normally be tolerated over a wireless link. Delays can be minimized over the wireless link by eliminating unnecessary computationally intensive functions such as voice and data compression.

Fourth Disaster Recovery Embodiments

In a fourth set of embodiments, devices 100 provide a control path to the tower equipment for equipment management purposes. In certain embodiments, the backup connection may used to provide an "in band" control channel for remote access to devices 100 in times of emergency. During standard operation, management access to the equipment may normally be provided over the exemplary TDM link or over ancillary connections such as a dial-up line, private IP, or a public Internet connection. The control channel may provide, for example, two-way communication to devices 100 for the purposes of monitoring and control, to provide real time diagnostic and status information, and to provide ancillary information such as call detail records used for load analysis and billing purposes.

In certain embodiments, the control channel may be used to inform the management system (which may be located anywhere in the world) for example, that there has been a failure, and that the backup circuit is up and running. Although the initial configuration of the unit may be to bring the backup circuit on line in minimal configuration, once the control channel has allowed direct operator control of the equipment, additional capacity may be added or other operational parameters may be programmed into the system in real time as required. In the event that the primary link, for example connection 308, is reestablished, the equipment may be programmed to fall back to the primary link gradually, or after certain other thresholds of stability have been met. Alternatively, the control channel may be used such that the switch back to the primary link is made entirely under manual control, with real time status information viewed by the remote operator being used to make the decision.

Fifth Disaster Recovery Embodiments

In a fifth set of embodiments, devices 100 provide the ability to convert between transmission protocols, such as from a TDM data structure to IP, and back again. The latter may include, for example, clock regeneration and jitter buffering at the remote location to maintain synchronization to the core network.

An exemplary feature of the equipment described is the ability to provide a backup path for the TDM links as transparently as possible to the systems connected at both ends, regardless of the transport medium and the protocol used to provide the backup connection. Two variables that may be accommodated in order for the proposed solution to be flexible and operate with a wide variety of potential network solutions include (i) accommodation for a wide potential variation in time delay across the network path, and (ii) buffering to allow the continuous operation of the first transmission protocol, such as exemplary TDM circuits, while receiving and transmitting discontinuous data packets over the second transmission protocol, such as exemplary IP connection (for example, to compensate for gaps between blocks of information received from the IP network that need to be continuously transmitted without a break over the TDM circuit).

In an exemplary TDM circuit the data may be continuously transmitted without a break and each bit may be timed with a precise clock that is distributed from the core network outwards. For example, it is normally essential to the operation of a typical TDM network that the clock signal be passed transparently downstream from network node to network node without a break. On the other hand, in an IP network typical of the exemplary satellite and wireless backup networks described above, data may be divided into discrete packets of information which are independently transmitted over the network with varying gap times between the packets. Due to this basic difference in mode of operation there is no inherent way to directly pass TDM clock timing between IP network nodes.

As outlined above, the basic method of operation of an IP packet based network is that of accumulating information for a period of time and then transmitting it in a burst of data known as a packet. There is therefore a period of accumulation during which time the data is stored at the transmitting end of the link, a processing delay while the "packet" is created, a period of packet transmission, a period of accumulation at the receiving end of the link, a period of processing at the receiving end of the link and finally a period of transmission to the local equipment. The actual delays incurred may vary considerably from packet to packet with the result that some or all TDM timing is lost during the conversion from TDM data into an IP packet and back again. In addition to the variations in packet delay incurred during the process described above, additional very significant delays may be incurred traversing the network architecture, specifically in the case of satellite links such as links 310, 312, but also over international links such as through gateways between public IP networks (not shown). Timing at the received (remote) end of the link may be synchronized to the primary network using a combination of high speed electronic hardware and controlling software. The mechanism used to recover and maintain timing synchronization between the remote and head ends of the link can be adjusted, for example, through a range of operating parameters to optimize changes in clock frequency variance according to the general requirements and jitter specifications of the core network.

In accordance with the present embodiments, disaster recovery algorithms of computer platform 114, of an exemplary device 100, provide the capability of taking exemplary TDM data received in discontinuous packets from a remote transmitting station and recreating a continuous, timed, TDM circuit at the receiving end of the link. A wide variation in packet and network delays can accommodated by the equipment such that from the viewpoint of the end equipment, completely transparent end-to-end TDM operation is accomplished. Device 100 provides seamless conversion to IP and back again through the foregoing so that conventional IP network links such as satellite, wireless and terrestrial IP networks can be used to provide an automated backup function to TDM circuits.

For example, in an embodiment the clock at the remote location (receiving end) of the link may be set to the nominal working frequency of the core network. Received data may be stored in a temporary buffer, the size of which is adjusted to allow for any mismatch between the clocks at each end of the link. Each clock cycle at the remote location may correspond to the transfer of one bit of data out of the buffer. At the remote location, the local clock may need to be adjusted slightly (for example, by a minuscule amount) up or down to match the core network clock rate. If the remote clock is slower than the core rate, for example, the temporary storage buffer may eventually be overrun (overfill), causing a network error. If the remote clock is faster than the core rate, the temporary storage buffer may eventually under-run (run-out), also causing a network error.

In addition, the data received from the core of the network may not be received at a steady rate but received in packets, the contents of which are stored in the local buffer en-mass before being transmitted to the local T1/E1 equipment. Additionally, there may be a variation in the delay between packets received over the link. Data may be clocked out from the buffer at a constant bit rate, based on the local clock.

Here, the clock regeneration algorithm may have to determine which direction the clock at the receiving end would need to be adjusted even though the buffer may be refilled at different times and in a different way than it is being emptied. The adjustment may be based, for example, on average readings of how full the buffer is over a long period of time, to smooth out the effect of network delays and the low delivery rate of packets. In varying embodiments, the decision by how much and how often to adjust the clock up or down may be limited by the clock jitter specifications of the local equipment and/or network. This may be accomplished, for example, by careful selection of buffer size, packet size and choice of averaging algorithm. These parameters may be adjusted in the context of wider configuration criteria, such as the number of different locations being supported, the number of trunks being supported to each location, and overall packet throughput limitations of the attached equipment and network.

In an exemplary embodiment, device 100 uses the following method to accomplish this conversion using a locally generated TDM clock. For example, the locally generated TDM clock is based on a standard crystal generated timing circuit that is a close approximation to the desired TDM clock rate. The circuit may be designed such that it can be minutely changed under the control of computer platform 114 to be slightly faster or slower than the nominal rate. By buffering data at the receiving end of the link, the locally generated TDM clock may be adjusted to keep the incoming IP data buffer at a desired mean (average) capacity level by nudging the TDM clock to be slightly faster or slightly slower at regular intervals. In an embodiment, the size of the buffer, the frequency and size of the adjustments, and the total amount the nominal frequency of the clock are adjusted under such control to meet the delay and jitter requirements of the network and/or equipment attached. Using this method TDM timing can be generated at the remote end that keeps the buffer from either underflow or overflow, and therefore can keep the remote equipment in delayed operational synchronization with the primary network.

Referring back to the third embodiment, in an exemplary illustration of the third embodiment, the embodiment may primarily cover the backup of preselected channels (for example, channels 1-12 out of, for example, 22 channels) from all active channels. In this illustration, only such preselected channels may be backed-up. Here, the number of selected channels may be matched to the bandwidth available on the backup service, which may be obtained from a shared pool of available bandwidth (for example, from a shared satellite link), with other dynamic services such as called-number blocking being added on top.

In the present embodiment, some flexibility may be added to such an illustration of the third embodiment. For example, specifying which channels are being backed up may be avoided, and only those calls which have met certain criteria may be passed through the system. Following the above example, even though space for only 12 channels may be available on a backup link, all 22 circuits may, for example, be backed up with only the first 12 that meet the selection criteria being be passed through. The selection of which 12 out of 22 are passed through may be automatically and dynamically chosen, based on the called criteria at the moment.

This section also deals in a little more depth with dynamic functions such as call blocking based on other criteria than just the number called, such as time of day or what backup circuits are in service.

Sixth Disaster Recovery Embodiments

In a sixth set of embodiments, devices 100 provide the ability to present a full link structure (for example a TDM link structure) to the cellular carriers (for example for cellular networks 200, 316) at both ends of the exemplary link 308, while only transmitting information from certain designated timeslots across the backup IP connection. The latter may allow a much lower bandwidth connection over, for example, exemplary satellite link 310-312 (for example, 300 Kbps) to backup a full T1/E1/T3 or multiple T1/E1/T3 connections. Using this example, a 300 Kbps backup IP connection using exemplary device 100 permits a range, for example from 16 to 24 (depending on configuration) of emergency backup circuits to an exemplary cell tower.

In certain embodiments where the TDM data stream at both ends of the exemplary link 308 are broken down and rebuilt along with some or all applicable timing at the receiving end of the link, namely at second device 100 (right side), the data may undergo significant processing before being actually transmitted over the backup link, such as exemplary backup system 310-312. This is most significant when relatively expensive satellite network connections are used for backup, in which case in the present embodiments the voice and data circuits may be compressed before transmission in order to minimize the bandwidth used, and hence minimize backup link cost.

Furthermore, the payload of some timeslots may be selected for being dropped entirely under predefined or real time determined circumstances, in order to minimize the satellite bandwidth used. This is possible because the structure of the TDM data stream at the remote location is entirely under the control of the equipment there, and can be rebuilt as if those specific data timeslots were not being used at all. This capability allows selective call blocking to be performed during an emergency (for example at an isolated cell tower) and may be used to block certain call types, or alternatively only allow calls to certain numbers from traversing the network when the backup link is active, or when other criteria are met (for example, time of day/week/year etc.).

An Exemplary Computer System

Figure 4:
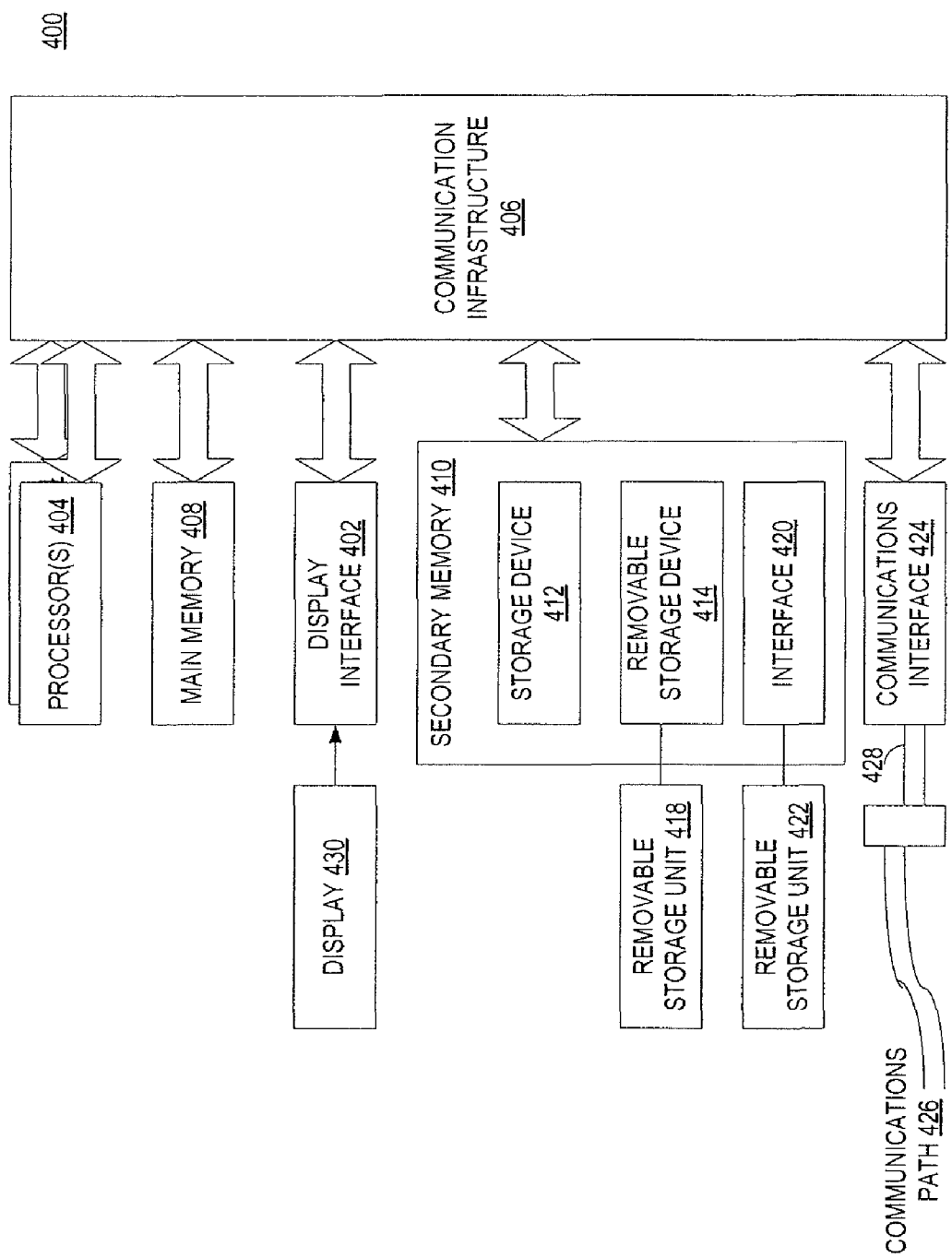
FIG. 4 illustrates an exemplary embodiment of a computer system that may be used to practice the system and/or methods in accordance with the present embodiments.

FIG. 4 depicts an exemplary embodiment of a computer system 400 that may be used in association with, in connection with, and/or in place of, but not limited to, computer platform 114, according to exemplary embodiments of the present invention.

The present embodiments (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 400 is shown in FIG. 4, depicting an exemplary embodiment of a block diagram of an exemplary computer system useful for implementing the present invention. Specifically, FIG. 4 illustrates an example computer 400, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/, etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., Mac/OS from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 400 is shown in FIG. 4. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 4.

The computer system 400 may include one or more processors, such as, e.g., but not limited to, processor(s) 404. The processor(s) 404 may be connected to a communication infrastructure 406 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 400 may include a display interface 402 that may forward, e.g., but not limited to, graphics, text, and other data, etc., from the communication infrastructure 406 (or from a frame buffer, etc., not shown) for display on the display unit 430.

The computer system 400 may also include, e.g., but may not be limited to, a main memory 408, random access memory (RAM), and a secondary memory 410, etc. The secondary memory 410 may include, for example, (but not limited to) a hard disk drive 412 and/or a removable storage drive 414, representing a floppy diskette drive, a magnetic tape drive, an optical disk drive, a compact disk drive CD-ROM, etc. The removable storage drive 414 may, e.g., but not limited to, read from and/or write to a removable storage unit 418 in a well known manner. Removable storage unit 418, also called a program storage device or a computer program product, may represent, e.g., but not limited to, a floppy disk, magnetic tape, optical disk, compact disk, etc. which may be read from and written to by removable storage drive 414. As will be appreciated, the removable storage unit 418 may include a computer usable storage medium having stored therein computer software and/or data.

In alternative exemplary embodiments, secondary memory 410 may include other similar devices for allowing computer programs or other instructions to be loaded into computer system 400. Such devices may include, for example, a removable storage unit 422 and an interface 420. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 422 and interfaces 420, which may allow software and data to be transferred from the removable storage unit 422 to computer system 400.

Computer 400 may also include an input device such as, e.g., (but not limited to) a mouse or other pointing device such as a digitizer, and a keyboard or other data entry device (none of which are labeled).

Computer 400 may also include output devices, such as, e.g., (but not limited to) display 430, and display interface 402. Computer 400 may include input/output (I/O) devices such as, e.g., (but not limited to) communications interface 424, cable 428 and communications path 426, etc. These devices may include, e.g., but not limited to, a network interface card, and modems (neither are labeled). Communications interface 424 may allow software and data to be transferred between computer system 400 and external devices. Examples of communications interface 424 may include, e.g., but may not be limited to, a modem, a network interface (such as, e.g., an Ethernet card), a communications port, a Personal Computer Memory Card International Association (PCMCIA) slot and card, etc. Software and data transferred via communications interface 424 may be in the form of signals 428 which may be electronic, electromagnetic, optical or other signals capable of being received by communications interface 424. These signals 428 may be provided to communications interface 424 via, e.g., but not limited to, a communications path 426 (e.g., but not limited to, a channel). This channel 426 may carry signals 428, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 414, a hard disk installed in hard disk drive 412, and signals 428, etc. These computer program products may provide software to computer system 400. The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting (other than by carrier wave) information in a form readable by a machine (e.g., a computer). For example, a machine-readable medium may include read only memory (ROM); random access memory (RAM); magnetic disk storage media; optical storage media; flash memory devices; and others, which is not transmitted by carrier wave.

Computer programs (also called computer control logic), may include object oriented computer programs, and may be stored in main memory 408 and/or the secondary memory 410 and/or removable storage units 414, also called computer program products. Such computer programs, when executed, may enable the computer system 400 to perform the features of the present invention as discussed herein. In particular, the computer programs, when executed, may enable the processor 404 to provide a method to resolve conflicts during data synchronization according to an exemplary embodiment of the present invention. Accordingly, such computer programs may represent controllers of the computer system 400.

In another exemplary embodiment, the invention may be directed to a computer program product comprising a computer readable medium having control logic (computer software) stored therein. The control logic, when executed by the processor 404, may cause the processor 404 to perform the functions of the invention as described herein. In another exemplary embodiment where the invention may be implemented using software, the software may be stored in a computer program product and loaded into computer system 400 using, e.g., but not limited to, removable storage drive 414, hard drive 412 or communications interface 424, etc. The control logic (software), when executed by the processor 404, may cause the processor 404 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

Exemplary embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; electrical, optical, acoustical or other form of propagated signals (e.g., carrier waves, infrared signals, digital signals, etc.), and others.

The exemplary embodiment of the present invention makes reference to wired, or wireless networks. Wired networks include any of a wide variety of well known means for coupling voice and data communications devices together. A brief discussion of various exemplary wireless network technologies that may be used to implement the embodiments of the present invention now are discussed. The examples are non-limited. Exemplary wireless network types may include, e.g., but not limited to, code division multiple access (CDMA), spread spectrum wireless, orthogonal frequency division multiplexing (OFDM), 1G, 2G, 3G wireless, Bluetooth, Infrared Data Association (IrDA), shared wireless access protocol (SWAP), "wireless fidelity" (Wi-Fi), WIMAX, and other IEEE standard 802.11-compliant wireless local area network (LAN), 802.16-compliant wide area network (WAN), and ultrawideband (UWB), etc.

Bluetooth is an emerging wireless technology promising to unify several wireless technologies for use in low power radio frequency (RF) networks.

IrDA is a standard method for devices to communicate using infrared light pulses, as promulgated by the Infrared Data Association from which the standard gets its name. Since IrDA devices use infrared light, they may depend on being in line of sight with each other.

The exemplary embodiments of the present invention may make reference to WLANs. Examples of a WLAN may include a shared wireless access protocol (SWAP) developed by Home radio frequency (HomeRF), and wireless fidelity (Wi-Fi), a derivative of IEEE 802.11, advocated by the wireless Ethernet compatibility alliance (WECA). The IEEE 802.11 wireless LAN standard refers to various technologies that adhere to one or more of various wireless LAN standards. An IEEE 802.11 compliant wireless LAN may comply with any of one or more of the various IEEE 802.11 wireless LAN standards including, e.g., but not limited to, wireless LANs compliant with IEEE std. 802.11a, b, d or g, such as, e.g., but not limited to, IEEE std. 802.11 a, b, d and g, (including, e.g., but not limited to IEEE 802.11g-2003, etc.), etc.

Conclusion

Although the invention is described in terms of this example environment, it is important to note that description in these terms is provided for purposes of illustration only. It is not intended that the invention be limited to this example environment or to the precise inter-operations between the above-noted entities and devices. In fact, after reading the following description, it will become apparent to a person skilled in the relevant art how to implement the invention in alternative environments.

What is claimed is:

1. An automated telecommunications backup system operable to provide an alternative transmission route for time division multiplexing (TDM) telecommunications traffic being transmitted over a primary TDM link, comprising:
   a first system operable to monitor the primary TDM link between a first telecommunications node at a first location and at least one second telecommunications node at an at least one second location on a TDM network for a failure condition, wherein at least one of the first location and the at least one second location comprises at least one of a customer premises, or a network provider premises; and
   a second system operable to interface to back up at least a portion of the TDM telecommunications traffic of the TDM link over an Internet protocol (IP) packet based backup network,
   wherein said first system that monitors the primary TDM link, upon the detection of the failure condition, causes said second system to switch into circuit the IP packet based backup network,
   wherein said second system is further operable to interface the TDM telecommunications traffic to be transported between the first telecommunications node and the at least one second telecommunications node on the TDM network wherein said second system is operable to at least one of:
      convert an outgoing portion of the TDM telecommunications traffic to IP traffic for transportation over the IP packet based backup network,
      convert an incoming portion of the IP traffic back to TDM telecommunications traffic to interface to TDM nodes,
      generate a TDM clock at the first location if required, or
      generate a TDM clock at the at least one second location if required,
   wherein the TDM clock of TDM equipment at the at least one second location is kept in delayed operational synchronization with the TDM clock of TDM equipment at the first location by adjusting the TDM clock at the at least one second location to meet delay and jitter requirements of the TDM equipment coupled together by the IP packet based backup network, and
   wherein said second system is operable to reestablish the primary TDM link upon detecting by said first system that the primary TDM link has been restored.

2. The system of claim 1, wherein the IP packet based backup network comprises any one or more of: a satellite based network; a wireless network; a cellular wireless network; a cellular wireless data network; or a terrestrial packet based network, and any of said networks comprises any one or more of: a public network; or a private network.

3. The system of claim 2, wherein the IP packet based backup network comprises a satellite based network and comprises at least one of:
   one or more uplinks;
   one or more downlinks;
   one or more very small aperture terminals (VSATs); or
   one or more geosynchronous earth orbit satellites.

4. The system of claim 1, wherein said first system stays substantially into circuit with the TDM link and actively terminates both connection endpoints thereof.

5. The system of claim 1, wherein in the event the failure condition is detected by said first system, said second system substantially redirects said telecommunications traffic of the TDM link across the point of link failure to the at least one second location.

6. The system of claim 5, wherein said second system compresses the telecommunications traffic of the TDM link to transmit a pre-designated number of time slots thereof.

7. The system of claim 6, wherein said second system uses any one or more of predetermined or preconfigured information to determine which portions of the telecommunications traffic to redirect.

8. The system of claim 1, wherein, said second system provides any one of an in-band control channel and an out-of-band control channel to remotely manage any one of the TDM link and the IP packet based backup network.

9. The system of claim 8, wherein the control channel provides two way communications to perform any one or more of: providing monitoring or control functions; determining real time diagnostic or status information; or determining ancillary information.

10. The system of claim 1, wherein the reestablishment of the primary TDM link is performed gradually after predetermined thresholds of stability are met.

11. The system of claim 1, wherein said second system further comprises a locally generated TDM clock to account for any one or more of delay or jitter requirements of the TDM network over the IP packet based backup network.

12. The system of claim 1, wherein one or more components of the telecommunications traffic of the TDM link are selected for any one of: transmission over the IP packet based backup network; and blocking thereof.

13. An automated telecommunications backup method operable to provide an alternative transmission route for time division multiplexing (TDM) telecommunications traffic being transmitted over a primary TDM link, comprising:
monitoring, by at least one processor, the primary TDM link between a first telecommunications node at a at a first location and at least one second telecommunications node at an at least one second location on a TDM network for a failure condition, wherein at least one of the first location and the at least one second location comprises at least one of a customer premises, or a network provider premises;
backing up, by the at least one processor, at least a portion of the TDM telecommunications traffic of the TDM link over an Internet protocol (IP) packet based backup network, wherein the primary TDM link is monitored and is switched into circuit with the IP packet based backup network upon detection of the failure condition;
interfacing, by the at least one processor, the TDM telecommunications traffic to be transported between the first telecommunications node and the at least one second telecommunications node on the TDM network, comprising at least one of:
converting an outgoing portion of the TDM telecommunications traffic to IP traffic for transporting over the IP packet based backup network,
converting an incoming portion of the IP traffic back to TDM telecommunications traffic to interface to TDM nodes,
generating a TDM clock at the first location if required, or
generating a TDM clock at the at least one second location if required;
wherein the TDM clock of TDM equipment at the at least one second location is kept in delayed operational synchronization with the TDM clock of TDM equipment at the first location by adjustment of the TDM clock at the at least one second location to meet delay and jitter requirements of the TDM equipment coupled together by the IP packet based backup network, and
reestablishing, by the at least one processor, the primary TDM link upon detection that the primary TDM link has been restored.

14. The method of claim 13, wherein the IP packet based backup network comprises any one or more of: a satellite based network; a wireless network; a data network; a cellular wireless data network; or a terrestrial packet based network, and any of said networks comprises any one of: a public network; and a private network.

15. The method of claim 13, wherein the backing up comprises staying substantially into circuit with the TDM link and actively terminating both connection endpoints thereof.

16. The method of claim 13, wherein in the event such failure condition is detected, the telecommunications traffic of the TDM link is substantially redirected across the point of link failure to the at least one second location.

17. The method of claim 16, further comprising compressing the telecommunications traffic of the TDM link to transmit a pre-designated number of time slots thereof.

18. The method of claim 17, further comprising using any one or more of predetermined or preconfigured information to determine which portions of the telecommunications traffic to redirect.

19. The method of claim 13, further comprising providing any one or more of an in-band control channel or an out-of-band control channel to remotely manage any one of the TDM link and the IP packet based backup network.

20. A non-transitory machine-readable medium that provides instructions, which when executed by a computing platform comprising at least one processor, causes said computing platform to perform operations comprising an automated telecommunications backup method operable to provide an alternative transmission route for time division multiplexing (TDM) telecommunications traffic being transmitted over a primary TDM link, the method comprising:
monitoring the primary TDM link between a first telecommunications node at a first location and at least one second telecommunications node at an at least one second location on a TDM network for a failure condition, wherein at least one of the first location and the at least one second location comprises at least one of a customer premises, or a network provider premises;
backing up at least a portion of the TDM telecommunications traffic of the TDM link over an Internet protocol (IP) packet based backup network, wherein the primary TDM link is monitored and is switched into circuit with the IP packet based backup network upon detection of the failure condition;
interfacing the TDM telecommunications traffic to be transported between the first telecommunications node and the at least one second telecommunications node on the TDM network, comprising at least one of:
converting an outgoing portion of the TDM telecommunications traffic to IP traffic for transporting over the IP packet based backup network,
converting an incoming portion of the IP traffic back to TDM telecommunications traffic to interface to TDM nodes,
generating a TDM clock at the first location if required, or
generating a TDM clock at the at least one second location if required;
wherein the TDM clock of the TDM equipment at the at least one second location is kept in delayed operational synchronization with the TDM clock of TDM equipment at the first location by adjustment of the TDM clock at the at least one second location to meet delay and jitter requirements of the TDM equipment coupled together by the IP packet based backup network, and
reestablishing the primary TDM link upon detection that the primary TDM link has been restored.

21. The automated telecommunications backup system of claim 1, wherein the system comprises at least one of:
wherein the customer premises comprises a location requiring an externally-provided TDM timing source, or
wherein the network provider premises comprises a location providing a TDM timing source.

* * * * *